(12) United States Patent
Engelberg et al.

(10) Patent No.: US 11,895,150 B2
(45) Date of Patent: Feb. 6, 2024

(54) DISCOVERING CYBER-ATTACK PROCESS MODEL BASED ON ANALYTICAL ATTACK GRAPHS

(71) Applicant: Accenture Global Solutions Limited, Dublin (IE)

(72) Inventors: Gal Engelberg, Pardes-hana (IL); Moshe Hadad, Rosh HaAyim (IL); Alexander Basovskiy, Hod Ha'sharon (IL)

(73) Assignee: Accenture Global Solutions Limited, Dublin (IE)

( * ) Notice: Subject to any disclaimer, the term of this patent is extended or adjusted under 35 U.S.C. 154(b) by 379 days.

(21) Appl. No.: 17/387,603

(22) Filed: Jul. 28, 2021

(65) Prior Publication Data

US 2023/0034910 A1 Feb. 2, 2023

(51) Int. Cl.
*H04L 9/40* (2022.01)
*G06N 20/00* (2019.01)
(Continued)

(52) U.S. Cl.
CPC ......... *H04L 63/1466* (2013.01); *G06N 20/00* (2019.01); *H04L 41/0816* (2013.01);
(Continued)

(58) Field of Classification Search
CPC ............. H04L 63/1466; H04L 41/0816; H04L 41/0886; H04L 43/067; H04L 63/1416;
(Continued)

(56) References Cited

U.S. PATENT DOCUMENTS

| 5,521,910 | A | 5/1996 | Matthews |
|---|---|---|---|
| 6,279,113 | B1 | 8/2001 | Vaidya |

(Continued)

FOREIGN PATENT DOCUMENTS

| EP | 1559008 | 8/2005 |
|---|---|---|
| EP | 1768043 | 3/2007 |

(Continued)

OTHER PUBLICATIONS

Brazhuk, "Towards automation of threat modeling based on a semantic model of attack patterns and weaknesses," arXiv, Dec. 8, 2021, arXiv:2112.04231v1, 14 pages.
(Continued)

*Primary Examiner* — Darren B Schwartz
(74) *Attorney, Agent, or Firm* — Fish & Richardson P.C.

(57) ABSTRACT

Implementations of the present disclosure include receiving analytical attack graph data representative of an analytical attack graph, the analytical attack graph including: one or more rule nodes each representing a network configuration rule; and one or more impact nodes each representing an impact of one or more respective network configuration rules; converting the analytical attack graph to a tactic graph including one or more tactic nodes, each tactic node representing at least one rule node and at least one impact node; determining one or more paths of the tactic graph that lead to a particular network impact; generating a process model based on the paths that lead to the particular network impact, the process model representing network activity for execution of a process that leads to the particular network impact; and executing one or more remedial actions based on the process model to mitigate cyber-security risk to the enterprise network.

18 Claims, 8 Drawing Sheets

(51) Int. Cl.
- *H04L 41/0816* (2022.01)
- *H04L 41/08* (2022.01)
- *H04L 43/067* (2022.01)
- *G06F 21/55* (2013.01)
- *G06F 21/57* (2013.01)

(52) U.S. Cl.
CPC ........ *H04L 41/0886* (2013.01); *H04L 43/067* (2013.01); *H04L 63/1416* (2013.01); *H04L 63/1425* (2013.01); *H04L 63/20* (2013.01)

(58) Field of Classification Search
CPC . H04L 63/1425; H04L 63/20; H04L 63/1433; G06N 20/00; G06F 21/552; G06F 21/577
See application file for complete search history.

(56) References Cited

U.S. PATENT DOCUMENTS

| | | | |
|---|---|---|---|
| 6,487,666 | B1 | 11/2002 | Shanklin et al. |
| 7,540,025 | B2 | 5/2009 | Tzadikario |
| 7,703,138 | B2 | 4/2010 | Desai et al. |
| 7,735,141 | B1* | 6/2010 | Noel .................. H04L 41/12 709/224 |
| 7,904,962 | B1 | 3/2011 | Jajodia et al. |
| 8,099,760 | B2 | 1/2012 | Cohen et al. |
| 8,176,561 | B1 | 5/2012 | Hurst et al. |
| 8,656,493 | B2 | 2/2014 | Capalik |
| 8,881,288 | B1 | 11/2014 | Levy et al. |
| 9,256,739 | B1 | 2/2016 | Roundy et al. |
| 9,292,695 | B1* | 3/2016 | Bassett .................. G06F 21/577 |
| 9,563,771 | B2 | 2/2017 | Lang et al. |
| 9,633,306 | B2 | 4/2017 | Liu et al. |
| 10,084,804 | B2 | 9/2018 | Kapadia et al. |
| 10,291,645 | B1 | 5/2019 | Frantzen et al. |
| 10,382,473 | B1 | 8/2019 | Ashkenazy et al. |
| 10,447,721 | B2 | 10/2019 | Lasser |
| 10,447,727 | B1 | 10/2019 | Hecht |
| 10,601,854 | B2 | 3/2020 | Lokamathe et al. |
| 10,642,840 | B1 | 5/2020 | Attaluri et al. |
| 10,659,488 | B1 | 5/2020 | Rajasooriya et al. |
| 10,771,492 | B2 | 9/2020 | Hudis et al. |
| 10,848,515 | B1 | 11/2020 | Pokhrel et al. |
| 10,868,825 | B1 | 12/2020 | Dominessy et al. |
| 10,873,533 | B1 | 12/2020 | Ismailsheriff et al. |
| 10,956,566 | B2 | 3/2021 | Shu et al. |
| 10,958,667 | B1 | 3/2021 | Maida et al. |
| 11,089,040 | B2 | 8/2021 | Jang et al. |
| 11,128,654 | B1 | 9/2021 | Joyce et al. |
| 11,159,555 | B2 | 10/2021 | Hadar et al. |
| 11,184,385 | B2 | 11/2021 | Hadar et al. |
| 11,232,235 | B2 | 1/2022 | Hadar et al. |
| 11,277,431 | B2 | 3/2022 | Hassanzadeh et al. |
| 11,281,806 | B2 | 3/2022 | Hadar et al. |
| 11,283,824 | B1 | 3/2022 | Berger et al. |
| 11,283,825 | B2 | 3/2022 | Grabois et al. |
| 11,411,976 | B2 | 8/2022 | Basovskiy et al. |
| 11,483,213 | B2 | 10/2022 | Engelberg et al. |
| 11,533,332 | B2 | 12/2022 | Engelberg et al. |
| 2005/0138413 | A1* | 6/2005 | Lippmann ........... H04L 63/1433 726/4 |
| 2005/0193430 | A1 | 9/2005 | Cohen et al. |
| 2006/0021034 | A1* | 1/2006 | Cook .................. H04L 63/20 726/22 |
| 2006/0037077 | A1 | 2/2006 | Gadde et al. |
| 2006/0212932 | A1* | 9/2006 | Patrick ................ H04L 63/1441 726/13 |
| 2007/0226796 | A1* | 9/2007 | Gilbert .................. G06F 21/577 726/25 |
| 2008/0044018 | A1 | 2/2008 | Scrimsher et al. |
| 2008/0289039 | A1 | 11/2008 | Rits et al. |
| 2008/0301765 | A1 | 12/2008 | Nicol et al. |
| 2009/0077666 | A1 | 3/2009 | Chen et al. |
| 2009/0138590 | A1 | 5/2009 | Lee et al. |
| 2009/0307772 | A1 | 12/2009 | Markham et al. |
| 2009/0319248 | A1 | 12/2009 | White et al. |
| 2010/0058456 | A1 | 3/2010 | Jajodia et al. |
| 2010/0138925 | A1 | 7/2010 | Barai et al. |
| 2010/0174670 | A1 | 7/2010 | Malik et al. |
| 2010/0192226 | A1* | 7/2010 | Noel .................. H04L 63/1425 726/25 |
| 2011/0035803 | A1 | 2/2011 | Lucangeli Obes et al. |
| 2011/0061104 | A1 | 3/2011 | Sarraute Yamada et al. |
| 2011/0093916 | A1 | 4/2011 | Lang et al. |
| 2011/0093956 | A1 | 4/2011 | Laarakkers et al. |
| 2013/0097125 | A1 | 4/2013 | Marvasti et al. |
| 2013/0219503 | A1 | 8/2013 | Amnon et al. |
| 2014/0082738 | A1 | 3/2014 | Bahl |
| 2014/0173740 | A1 | 6/2014 | Albanese et al. |
| 2015/0033346 | A1* | 1/2015 | Hebert .................. G06F 21/577 726/25 |
| 2015/0047026 | A1 | 2/2015 | Neil et al. |
| 2015/0106867 | A1 | 4/2015 | Liang |
| 2015/0199207 | A1 | 7/2015 | Lin et al. |
| 2015/0244734 | A1* | 8/2015 | Olson .................. G06F 21/577 726/25 |
| 2015/0261958 | A1 | 9/2015 | Hale et al. |
| 2015/0326601 | A1 | 11/2015 | Grondin et al. |
| 2015/0350018 | A1 | 12/2015 | Hui et al. |
| 2016/0105454 | A1* | 4/2016 | Li ...................... H04L 63/1416 726/23 |
| 2016/0205122 | A1* | 7/2016 | Bassett ............... H04L 63/1441 726/23 |
| 2016/0253232 | A1* | 9/2016 | Puri ................... H04L 63/1425 714/37 |
| 2016/0277423 | A1 | 9/2016 | Apostolescu et al. |
| 2016/0292599 | A1 | 10/2016 | Andrews et al. |
| 2016/0301704 | A1 | 10/2016 | Hassanzadeh et al. |
| 2016/0301709 | A1 | 10/2016 | Hassanzadeh et al. |
| 2016/0306980 | A1* | 10/2016 | Kotler .................. G06F 21/577 |
| 2017/0006055 | A1* | 1/2017 | Strom .................... G06F 30/20 |
| 2017/0012836 | A1 | 1/2017 | Tongaonkar et al. |
| 2017/0032130 | A1 | 2/2017 | Joseph et al. |
| 2017/0041334 | A1 | 2/2017 | Kahn et al. |
| 2017/0078322 | A1 | 3/2017 | Seiver et al. |
| 2017/0085595 | A1 | 3/2017 | Ng et al. |
| 2017/0163506 | A1 | 6/2017 | Keller |
| 2017/0230410 | A1 | 8/2017 | Hassanzadeh et al. |
| 2017/0318050 | A1 | 11/2017 | Hassanzadeh et al. |
| 2017/0324768 | A1 | 11/2017 | Crabtree et al. |
| 2017/0364702 | A1 | 12/2017 | Goldfarb et al. |
| 2017/0366416 | A1 | 12/2017 | Beecham et al. |
| 2018/0013771 | A1 | 1/2018 | Crabtree et al. |
| 2018/0103052 | A1* | 4/2018 | Choudhury ............. H04L 63/20 |
| 2018/0152468 | A1 | 5/2018 | Nor et al. |
| 2018/0159890 | A1 | 6/2018 | Warnick et al. |
| 2018/0183827 | A1 | 6/2018 | Zorlular et al. |
| 2018/0255077 | A1 | 9/2018 | Paine |
| 2018/0255080 | A1 | 9/2018 | Paine |
| 2018/0295154 | A1 | 10/2018 | Crabtree et al. |
| 2018/0367548 | A1 | 12/2018 | Stokes, III et al. |
| 2019/0052663 | A1 | 2/2019 | Lee et al. |
| 2019/0052664 | A1 | 2/2019 | Kibler et al. |
| 2019/0121979 | A1* | 4/2019 | Chari ..................... G06F 8/433 |
| 2019/0132344 | A1* | 5/2019 | Lem ....................... G06N 20/00 |
| 2019/0141058 | A1 | 5/2019 | Hassanzadeh et al. |
| 2019/0182119 | A1 | 6/2019 | Ratkovic et al. |
| 2019/0188389 | A1 | 6/2019 | Peled et al. |
| 2019/0230106 | A1* | 7/2019 | Abbaszadeh ....... H04L 63/1441 |
| 2019/0230129 | A1 | 7/2019 | Digiambattista et al. |
| 2019/0312898 | A1 | 10/2019 | Verma et al. |
| 2019/0319987 | A1 | 10/2019 | Levy et al. |
| 2019/0362279 | A1 | 11/2019 | Douglas |
| 2019/0373005 | A1 | 12/2019 | Bassett |
| 2020/0014265 | A1 | 1/2020 | Whebe |
| 2020/0014718 | A1 | 1/2020 | Joseph Durairaj et al. |
| 2020/0042328 | A1 | 2/2020 | Gupta |
| 2020/0042712 | A1 | 2/2020 | Foo et al. |
| 2020/0045069 | A1 | 2/2020 | Nanda et al. |
| 2020/0059481 | A1* | 2/2020 | Sekar .................. H04L 63/1425 |
| 2020/0099704 | A1 | 3/2020 | Lee et al. |
| 2020/0112487 | A1 | 4/2020 | Inamdar et al. |
| 2020/0128047 | A1 | 4/2020 | Biswas et al. |
| 2020/0137104 | A1* | 4/2020 | Hassanzadeh ....... H04L 63/1433 |

(56) References Cited

U.S. PATENT DOCUMENTS

| | | | |
|---|---|---|---|
| 2020/0175175 A1 | 6/2020 | Hadar et al. | |
| 2020/0177615 A1 | 6/2020 | Grabois et al. | |
| 2020/0177616 A1 | 6/2020 | Hadar et al. | |
| 2020/0177617 A1* | 6/2020 | Hadar | G06F 21/552 |
| 2020/0177618 A1* | 6/2020 | Hassanzadeh | G06F 21/552 |
| 2020/0177619 A1 | 6/2020 | Hadar et al. | |
| 2020/0272972 A1 | 8/2020 | Harry et al. | |
| 2020/0296137 A1 | 9/2020 | Crabtree et al. | |
| 2020/0311630 A1 | 10/2020 | Risoldi et al. | |
| 2020/0351295 A1 | 11/2020 | Nhlabatsi et al. | |
| 2020/0358804 A1 | 11/2020 | Crabtree et al. | |
| 2021/0006582 A1 | 1/2021 | Yamada et al. | |
| 2021/0099490 A1 | 4/2021 | Crabtree et al. | |
| 2021/0105294 A1 | 4/2021 | Kruse et al. | |
| 2021/0168175 A1 | 6/2021 | Crabtree et al. | |
| 2021/0173711 A1 | 6/2021 | Crabtree et al. | |
| 2021/0218770 A1 | 7/2021 | Ben-Yosef et al. | |
| 2021/0248443 A1 | 8/2021 | Shu et al. | |
| 2021/0258334 A1* | 8/2021 | Sayag | H04L 63/1425 |
| 2021/0273978 A1 | 9/2021 | Hadar et al. | |
| 2021/0288995 A1 | 9/2021 | Attar et al. | |
| 2021/0336981 A1 | 10/2021 | Akella et al. | |
| 2021/0409426 A1 | 12/2021 | Engelberg et al. | |
| 2021/0409439 A1 | 12/2021 | Engelberg et al. | |
| 2022/0014445 A1 | 1/2022 | Engelberg et al. | |
| 2022/0014534 A1 | 1/2022 | Basovskiy et al. | |
| 2022/0021698 A1 | 1/2022 | Hadar et al. | |
| 2022/0038491 A1 | 2/2022 | Hadar et al. | |
| 2022/0051111 A1 | 2/2022 | Hadar et al. | |
| 2022/0070202 A1 | 3/2022 | Busany et al. | |
| 2022/0124115 A1 | 4/2022 | Grabois et al. | |
| 2022/0129590 A1 | 4/2022 | Hadar et al. | |
| 2022/0131894 A1 | 4/2022 | Hassanzadeh et al. | |
| 2022/0150270 A1 | 5/2022 | Klein et al. | |
| 2022/0182406 A1 | 6/2022 | Inokuchi | |
| 2022/0188460 A1 | 6/2022 | Hadar et al. | |
| 2022/0263855 A1 | 8/2022 | Engelberg et al. | |
| 2022/0337617 A1 | 10/2022 | Basovskiy et al. | |
| 2023/0021961 A1 | 1/2023 | Engelberg et al. | |
| 2023/0067128 A1 | 3/2023 | Engelberg et al. | |
| 2023/0067777 A1 | 3/2023 | Hadar et al. | |
| 2023/0076372 A1 | 3/2023 | Engelberg et al. | |

FOREIGN PATENT DOCUMENTS

| | | | | |
|---|---|---|---|---|
| EP | 2385676 | | 11/2011 | |
| EP | 2816773 | | 12/2014 | |
| EP | 3644579 | | 4/2020 | |
| EP | 3664411 | | 6/2020 | |
| GB | 2583892 | A * | 11/2020 | H04L 27/3881 |
| WO | WO 2018/002484 | | 1/2018 | |
| WO | WO 2020/242275 | | 12/2020 | |

OTHER PUBLICATIONS

EP Extended Search Report in European Appln. No. 22157487.4, dated Jun. 9, 2022, 10 pages.

Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.

Hemberg et al., "Using a Collated Cybersecurity Dataset for Machine Learning and Artificial Intelligence," arXiv, Aug. 5, 2021, arXiv:2108.02618v1, 5 pages.

Horrocks et al., "SWRL: A Semantic Web Rule Language Combining OWL and RuleML," W3C Member Submission, May 21, 2004, 24 pages.

Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.

Rossi et al., "Knowledge Graph Embedding for Link Prediction: A Comparative Analysis," arXiv, Feb. 3, 2020, arXiv:2002.00819v1, 42 pages.

Wikipedia.org [online], "Natural language processing," last updated Jun. 10, 2022, retrieved on Jun. 14, 2022, retrieved from URL<https://en.wikipedia.org/wiki/Natural_language_processing>, 13 pages.

Kaloroumakis et al., "Toward a Knowledge Graph of Cybersecurity Countermeasures," Technical Report, The MITRE Corporation, 2021, 11 pages.

MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.

MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.

MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.

Wikipedia.org [online], "Reachability," last updated Oct. 22, 2021, retrieved on Jul. 13, 2022, retrieved from URL<https://en.wikipedia.org/wiki/Reachability>, 5 pages.

EP Extended Search Report in European Appln. No. 21191752.1, dated Jan. 4, 2022, 8 pages.

Abraham et al. "A Predictive Framework for Cyber Security Analytics Using Attack Graphs." International Journal of Computer Networks & Communications (IJCNC). Vol. 7, No. 1, Jan. 2015. (Year: 2015).

Narmeen Zakaria Bawany; DDOS Attack Detection and Mitigation Using SDN: Methods, Practices, and Solutions; Springer-2017; p. 425-441.

Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).

X. Li, C. Zhang, T. Jung, J. Qian and L. Chen, "Graph-based privacy-preserving data publication," IEEE Infocom 2016—The 35th Annual IEEE International Conference on Computer Communications, 2016, pp. 1-9, doi: 10.1109/IN F000M.2016.7524584. (Year: 2016).

EP Extended Search Report in European Appln. No. 22193272.6, dated Jan. 25, 2023, 8 pages.

Chen Zhong, Towards Agile Cyber Analysis: Leveraging Visualization as Functions in Collaborative Visual Analytics, IEEE:2017, pp. 1-2.

EP Extended Search Report in European Appln. No. 22187514.9, dated Nov. 29, 2022, 7 pages.

Almeida et al., "An ontological analysis of the notion of community in the RM-ODP enterprise language," Computer Standards & Interfaces, Mar. 2013, 35(3):257-268.

Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.

Ashton et al., "That 'internet of things' thing," RFID Journal, Jun. 22, 2009, 1 page.

Borgo et al., "Ontological Foundations of DOLCE," Theory and Applications of Ontology: Computer Applications, Aug. 5, 2010, 279-295.

Burger et al., "Scaling to the end of silicon with edge architectures," Computer, Jul. 2004, 37(7):44-55.

Cravero, "Big data architectures and the internet of things: A systematic mapping study," IEEE Latin America Transactions, Apr. 2018, 16(4):1219-1226.

Daniele et al., "An ontological approach to logistics," Enterprise Interoperability: Research and Applications in the Service-oriented Ecosystem, Oct. 11, 2013, 199-213.

(56) References Cited

OTHER PUBLICATIONS

Degen et al., "Gol: toward an axiomatized upper-level ontology," Presented at Proceedings of the International Conference on Formal Ontology in Information Systems, Ogunquit, Maine, USA, Oct. 17-19, 2001, 34-46.

Duarte et al., "Towards an Ontology of Requirements at Runtime," Formal Ontology in Information Systems, Jan. 2016, 283:255-268.

El Saddik, "Digital Twins: The Convergence of Multimedia Technologies," IEEE MultiMedia, Apr.-Jun. 2018, 25(2):87-92.

Gailly et al., "Ontological Reengineering of the REA-EO using UFO," Presented at Proceedings of the International Workshop on Ontology-Driven Software Engineering, Orlando, FL, USA, Oct. 2009, 15 pages.

Gandomi et al., "Beyond the hype: Big data concepts, methods, and analytics," International Journal of Information Management, Apr. 2015, 35(2):137-144.

Genovese, "Data mesh: the newest paradigm shift for a distributed architecture in the data world and its application," Thesis for the degree of Computer Engineering, Politecnico di Torino, 2021, 76 pages.

Giunchiglia et al., "Lightweight Ontologies," Technical Report DIT-07-071, University of Trento, Oct. 2007, 10 pages.

Gomez-Perez et al., "Ontology languages for the Semantic Web," IEEE Intelligent Systems, Feb. 2002, 17(1):54-60.

Guarino, "Formal Ontology in Information Systems," Presented at Proceedings of the 1st International Conference, Trento, Italy, Jun. 6-8, 1998, 3-15.

Guizzardi et al., "An Ontology-Based Approach for Evaluating the Domain Appropriateness and Comprehensibility Appropriateness of Modeling Languages," MoDELS, 2005, 691-705.

Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.

Guizzardi, "Ontological Foundations for Structural Conceptual Models," Thesis for the degree of Doctor, University of Twente, 2005, 441 pages.

Guizzardi, "Ontology, Ontologies and the "I" of FAIR," Data Intelligence, Jan. 1, 2020, 2(1-2):181-191.

Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.

Hassani et al., "Artificial Intelligence (AI) or Intelligence Augmentation (IA): What Is the Future?," AI, Apr. 12, 2020, 1(2):143-155.

Herre, "General Formal Ontology (GFO): A Foundational Ontology for Conceptual Modelling," Theory and Applications of Ontology: Computer Applications, Aug. 12, 2010, 297-345.

Jacobsen et al., "FAIR Principles: Interpretations and Implementation Considerations," Data Intelligence, Jan. 1, 2020, 2(1-2):10-29.

Machado et al., "Data Mesh: Concepts and Principles of a Paradigm Shift in Data Architectures," Procedia Computer Science, 2022, 196:263-271.

Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.

Makridakis, "The forthcoming artificial intelligence (ai) revolution: Its impact on society and firms," Futures, Jun. 2017, 90:46-60.

Martins et al., "A framework for conceptual characterization of ontologies and its application in the cybersecurity domain," Software and Systems Modeling, Jul. 2, 2022, 21:1437-1464.

Martins et al., "Conceptual Characterization of Cybersecurity Ontologies," The Practice of Enterprise Modelling, Nov. 18, 2020, 323-338.

Mathis, "Data lakes," Datenbank-Spektrum, Oct. 6, 2017, 17(3):289-293.

Monino, "Data Value, Big Data Analytics, and Decision-Making," Journal of the Knowledge Economy, Aug. 20, 2016, 256-267.

Sales et al., "Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.

Sitton-Candanedo et al., "A review of edge computing reference architectures and a new global edge proposal," Future Generation Computer Systems, Oct. 2019, 99:278-294.

Tan et al., "Future internet: The Internet of Things," Presented at Proceedings of the 2010 3rd International Conference on Advanced Computer Theory and Engineering (ICACTE), Chengdu, China, Aug. 20-22, 2010.

Uschold et al., "Ontologies: Principles, methods and applications," The Knowledge Engineering Review, Jan. 1996, 11(2):93-136.

Van Heijst et al., "Using explicit ontologies in KBS development," International Journal of Human-Computer Studies, Feb. 1997, 46(2-3):183-292.

Wand et al., "On the deep structure of information systems," Information Systems Journal, Jul. 1995, 5(3):203-223.

Wang et al., "Big data analytics in cyber security: network traffic and attacks," Journal of Computer Information Systems, Jan. 2020, 61(3):1-8.

Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.

CyberSecurityWorks.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.

Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.

Das et al., "V2W-BERT: A Framework for Effective Hierarchical Multiclass Classification of Software Vulnerabilities," CoRR, submitted on Feb. 23, 2021, arXiv:2102.11498v1, 11 pages.

GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.

Grigorescu et al., "CVE2ATT&CK: BERT-Based Mapping of CVEs to MITRE ATT&CK Techniques," Algorithms, Aug. 31, 2022, 15(9):314, 22 pages.

Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.

Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.

W3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

Abraham et al., "Cyber Security Analytics: A Stochastic Model for Security Quantification Using Absorbing Markov Chains," Journal of Communications, Dec. 2014, 9(12):899-907.

Alvarenga et al., "Discovering Attack Strategies Using Process Mining," Presented at Proceedings of The Eleventh Advanced

(56) References Cited

OTHER PUBLICATIONS

International Conference on Telecommunications, Brussels, Belgium, Jun. 21-26, 2015, 119-125.
Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.
Atoum et al., "A holistic cyber security implementation framework," Information Management & Computer Security, Jul. 2014, 22(3):251-264.
Barik et al., "Attack Graph Generation and Analysis Techniques," Defence Science Journal, Nov. 2016, 66(6):559-567.
Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.
Bonacich, "Power and Centrality: A Family of Measures," American Journal of Sociology, Mar. 1987, 92(5):1170-1182.
Borgatti et al., "A Graph-theoretic perspective on centrality," Social Networks, Oct. 2006, 28(4):466-484.
Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.
Chen et al., "Distributed Attack Modeling Approach Based on Process Mining and Graph Segmentation," Entropy, Sep. 2020, 22(9):1026, 21 pages.
Cohen-Addad et al., "Hierarchical Clustering: Objective Functions and Algorithms," Journal of the ACM, Jun. 2019, 66(4):26, 42 pages.
Coltellese et al., "Triage of IoT Attacks Through Process Mining," Presented at Proceedings of On the Move to Meaningful Internet Systems Conference 2019, Rhodes, Greece, Oct. 21-25, 2019; Lecture Notes in Computer Science, Oct. 2019, 11877:326-344.
EP Search Report in European Application No. EP 19212981, dated Mar. 4, 2020, 6 pages.
EP Search Report in European Application No. EP13290145, dated Nov. 12, 2013, 2 pages.
EP Search Report in European Application No. EP19212974, dated Feb. 14, 2020, 8 pages.
EP Search Report in European Application No. EP19212976, dated Feb. 14, 2020, 8 pages.
EP Search Report in European Application. No. 21159421.3, dated Jun. 30, 2021, 11 pages.
EP Search Report in European Application. No. EP20185251, dated Oct. 21, 2020, 7 pages.
Fielder et al., "Decision support approaches for cyber security investment," Decision Support Systems, Jun. 2016, 86:13-23.
Foundations of Databases, 1st ed., Abiteboul et al. (eds.), 1995, Chapter 12, 38 pages.
Fundamentals of Business Process Management, 2nd ed., Dumas et al. (eds.), 2018, 546 pages.
GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.
Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.
Grieves, "Virtually Intelligent Product Systems: Digital and Physical Twins", Complex Systems Engineering: Theory and Practice, Jul. 2019, 256:175-200.
Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.
Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.
Hansen et al., "Model-in-the-Loop and Software-in-the-Loop Testing of Closed-Loop Automotive Software with Arttest," Informatik, 2017, 13 pages.
Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.
Hofner et al., "Dijkstra, Floyd and Warshall meet Kleene," Formal Aspects of Computing, Jul. 2012, 24(4-6):459-476.
Husák et al., "Survey of Attack Projection, Prediction, and Forecasting in Cyber Security," IEEE Communications Surveys & Tutorials, Sep. 24, 2018, 21(1):640-660.
Idika et al., "Extending attack graph-based security metrics and aggregating their application," IEEE Transactions on Dependable and Secure Computing, Jan./Feb. 2012, 9(1):75-85.
IEEE, "IEEE Standard for extensible Event Stream (XES) for Achieving Interoperability in Event Logs and Event Stream," IEEE Std 1849™—2016, Sep. 22, 2016, 50 pages.
IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.
Ingols et al., "Practical Attack Graph Generation for Network Defense." 2006 22nd Annual Computer Security Applications Conference (ACSAC'06), Miami Beach, Florida, Dec. 11-15, 2006, 10 pages.
International Organization for Standardization, "International Standard: ISO/IEC 27001," ISO/IEC 27001:2013(E), Oct. 1, 2013, 29 pages.
Joint Task Force Transformation Initiative, "Security and Privacy Controls for Federal Information Systems and Organizations," National Institute of Standards and Technology Special Publication 800-53, Revision 4, Jan. 22, 2015, 462 pages.
Khouzani et al., "Scalable min-max multi-objective cyber-security optimization over probabilistic attack graphs", European Journal of Operational Research, Nov. 1, 2019, 278(3):894-903.
Li et al., "Cluster security research involving the modeling of network exploitations using exploitation graphs," Proceedings of the IEEE International Symposium on Cluster Computing and the Grid, Singapore, May 16-19, 2006, 11 pages.
Lippmann et al., "Validating and restoring defense in depth using attack graphs," Proceedings of the Military Communications Conference, Washington, DC, USA, Oct. 23-25, 2006, 10 pages.
Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.
Manning Free Content Center [online], "Building Your Vocabulary," dated May 19, 2017, retrieved on Jun. 3, 2020, retrieved from URL <https://freecontent.manning.com/building-your-vocabulary/>, 10 pages.
MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.
Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.
Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.
Murata, "Petri Nets: Properties, Analysis and Applications," Proceedings of the IEEE, Apr. 1989, 77(4):541-580.
National Institute of Standards and Technology [online], "National Vulnerability Database," last updated Jun. 2, 2020, retrieved on Jun. 3, 2020, retrieved from URL<https://nvd.nist.gov/>, 4 pages.

(56) References Cited

OTHER PUBLICATIONS

Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.

Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/>, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.

Networks: An Introduction, Newman (ed.), May 2010, 789 pages.

Noel et al., "CyGraph: Graph-Based Analytics and Visualization for Cybersecurity," Handbook of Statistics, Jan. 2016, 35:117-167.

Ortalo et al., "Experimenting with quantitative evaluation tools for monitoring operational security," IEEE Transactions on Software Engineering, Sep./Oct. 1999, 25(5):633-650.

Ou et al., "A Scalable Approach to Attack Graph Generation," Proceedings of the 13th ACM Conference on Computer and Communication Security, Oct. 2006, 336-345.

Ou et al., "MulVAL: A Logic-based Network Security Analyzer," 14th USENIX Security Symposium, Aug. 2005, Baltimore, MD, USA, 16 pages.

Phillips et al., "A graph-based system for network-vulnerability analysis," Proceedings of the 1998 Workshop on New Security Paradigms, Charlottesville, Virginia, Sep. 22-26, 1998, 71-79.

PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.

PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.

Process Mining, 1st ed., van der Aalst, 2011, Chapters 5-6, 63 pages.

Purvine et al., "A Graph-Based Impact Metric for Mitigating Latheral Movement Cyber Attacks", Automated Descision Making for Active Cyber Defence, Oct. 2016, pp. 45-52.

Schatz et al., "Economic valuation for information security investment: a systematic literature review," Information Systems Frontiers, Apr. 18, 2016, 19:1205-1228.

Shandilya et al., "Use of Attack Graphs in Security Systems", Hindawi Journal of Computer Networks and Communications, Oct. 20, 2014, 2014:818957, 14 pages.

Shi et al., "Normalized Cuts and Image Segmentation," IEEE Transactions on Pattern Analysis and Machine Intelligence, Aug. 2000, 22(8):888-905.

Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.

SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.

Sourceforge.net [online], "XSB," last updated Oct. 29, 2017, retrieved on Jun. 3, 2020, retrieved from URL <http://xsb.sourceforge.net/>, 2 pages.

Stanek et al., "Method of comparing graph differencing algorithms for software differencing," 2008 IEEE International Conference on Electro/Information Technology, Ames, Iowa, May 18-20, 2008, 482-487.

Strom et al., "MITRE ATT&CK™: Design and Philosophy", The MITRE Corporation, Jul. 2018, 37 pages.

Swiler et al., "A graph-based network-vulnerability analysis system," Sandia National Laboratories, 1997, Tech. Rep. SAND97-3010/1, 25 pages.

TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.

The Fourth Industrial Revolution, 1st. ed., Schwab, Jan. 2017, 218 pages.

The MITRE Corporation [online], "MITRE ATT&CK," last updated May 27, 2020, retrieved on Jun. 3, 2020, retrieved from URL <https://attack.mitre.org/>, 3 pages.

Ullah et al., "Towards Modeling Attacker's Opportunity for Improving Cyber Resilience in Energy Delivery Systems", Resilience Week, Aug. 2018, pp. 100-107.

Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.

Vehicle Power Management, 1st ed., Zhang et al.(eds.), Aug. 2011, Chapter 10, 27 pages.

Wang et al., "A Network Vulnerability Assessment Method Based on Attack Graph," 2018 IEEE 4th International Conference on Computer and Communications, Dec. 7-10, 2018, Chengdu, China, 1149-1154.

Wang et al., "Exploring Attack Graph for Cost-benefit Security Hardening: A Probabilistic Approach," Computers & Security, Feb. 2013, 32:158-169.

Ward et al., "Threat Analysis and Risk Assessment in Automotive Cyber Security," SAE Int. J. Passeng. Cars Electron. Electr. Systems, May 2013, 6(2):507-513.

Wikipedia.org [online], "5G," last updated Jul. 9, 2021, retrieved on Jul. 9, 2021, retrieved from URL<https://en.wikipedia.org/wiki/5G>, 29 pages.

Wikipedia.org [online], "Active Directory," last updated Jun. 1, 2020, retrieved on Jun. 3, 2020, retrieved from URL <https://en.wikipedia.org/wiki/Active_Directory>, 14 pages.

Wikipedia.org [online], "Backward Chaining," last updated Nov. 16, 2019, retrieved on Jun. 3, 2020, retrieved from URL <https://en.wikipedia.org/wiki/Backward_chaining>, 3 pages.

Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.

Wikipedia.org [online], "Cartesian Product," last updated Feb. 28, 2020, retrieved on Jun. 3, 2020, retrieved from URL <https://en.wikipedia.org/wiki/Cartesian_product>, 9 pages.

Wikipedia.org [online], "Centrality," last updated May 29, 2020, retrieved on Jun. 3, 2020, retrieved from URL <https://en.wikipedia.org/wiki/Centrality>, 15 pages.

Wikipedia.org [online], "Centrality," last updated Oct. 18, 2020, retrieved on Oct. 26, 2020, retrieved from URL<https://en.wikipedia.org/wiki/Centrality>, 15 pages.

Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.

Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.

Wikipedia.org [online], "Depth-first search," last updated Jun. 16, 2021, retrieved on Jul. 28, 2021, retrieved from URL<https://en.wikipedia.org/wiki/Depth-first_search>, 8 pages.

Wikipedia.org [online], "Digital twin," last updated Jul. 8, 2021, retrieved on Jul. 9, 2021, retrieved from URL<https://en.wikipedia.org/wiki/Digital_twin>, 13 pages.

(56) References Cited

OTHER PUBLICATIONS

Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.
Wikipedia.org [online], "Flood Fill," last updated Dec. 24, 2019, retrieved on Jun. 3, 2020, retrieved from URL <https://en.wikipedia.org/wiki/Flood_fill>, 7 pages.
Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.
Wikipedia.org [online], "Forward Chaining," last updated Nov. 18, 2019, retrieved on Jun. 3, 2020, retrieved from URL <https://en.wikipedia.org/wiki/Forward_chaining>, 3 pages.
Wikipedia.org [online], "Look-ahead (backtracking)," last updated May 23, 2020, retrieved on Jun. 3, 2020, retrieved from URL <https://en.wikipedia.org/wiki/Look-ahead_(backtracking)>, 3 pages.
Wikipedia.org [online], "SCADA," last updated Jun. 2, 2020, retrieved on Jun. 3, 2020, retrieved from URL <https://en.wikipedia.org/wiki/SCADA>, 12 pages.
Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.
Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.
Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.
Wikipedia.org [online], "Traffic flow," last updated Oct. 19, 2020, retrieved on Oct. 26, 2020, retrieved from URL<https://en.wikipedia.org/wiki/Traffic_flow>, 41 pages.

Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.
Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.
Yi et al., "Overview on attack graph generation and visualization technology," 2013 International Conference on Anti-Counterfeiting, Security and Identification (ASID), Shanghai, China, Oct. 25-27, 2013, 6 pages.
You et al., "A Review of Cyber Security Controls from An ICS Perspective," Proceedings of 2018 International Conference on Platform Technology and Service (PlatCon), Jan. 29-31, 2018, Jeju, South Korea, 5 pages.
Zeng et al., "Survey of Attack Graph Analysis Methods from the Perspective of Data and Knowledge Processing," Hindawi Security and Communication Networks, Dec. 26, 2019, 2019:2031063, 17 pages.
Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.
Zhang et al., "Optimal Decision-Making Approach for Cyber Security Defense Using Game Theory and Intelligent Learning," Security and Communication Networks, Dec. 23, 2019, 2019:3038586, 17 pages.
Zhao et al., "Attack graph analysis method for large scale network security hardening," J. Front. Comput. Sci. Technology, 2018, 12(2):263-273 (with English Abstract).

\* cited by examiner

DISCOVERING CYBER-ATTACK PROCESS MODEL BASED ON ANALYTICAL ATTACK GRAPHS

BACKGROUND

Enterprises execute operations across one or more networks of components, commonly referred to as computer networks. A computer network is made up of multiple interconnected components that communicate with one another to facilitate execution of enterprise operations. Example components can include computers, servers, database systems, and the like. Enterprise operations can include processes that are executed across multiple components within a network.

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

An important aspect in mitigating attacks is an understanding of the relationship between an attack process and a path within a network that the attack process occurs over. This can be referred to as cyber-attack process discovery within computer networks. An approach to cyber-attack discovery within computer networks needs to address multiple technical challenges.

SUMMARY

Implementations of the present disclosure are directed to cyber-attack process discovery in computer networks. More particularly, implementations of the present disclosure are directed to automated cyber-attack process discovery in computer networks by processing analytical attack graphs (AAGs) to provide a cyber-attack process model. As described in further detail herein, implementations of the present disclosure can be used to discover a model representing possible attack path types that exist in an AAG. The disclosed implementations can be used to provide simplified, scalable analytical models. Generated process models can be input to cyber security analytical programs for use in security risk evaluation, security risk management, and detection and tracking of in-progress attacks.

In some implementations, actions include receiving analytical attack graph data representative of an analytical attack graph, the analytical attack graph including: one or more rule nodes each representing a network configuration rule; and one or more impact nodes each representing an impact of one or more respective network configuration rules; converting the analytical attack graph to a tactic graph including one or more tactic nodes, each tactic node representing at least one rule node and at least one impact node; determining one or more paths of the tactic graph that lead to a particular network impact; generating a process model based on the one or more paths that lead to the particular network impact, the process model representing network activity for execution of a process that leads to the particular network impact; and executing, within the enterprise network, one or more remedial actions based on the process model to mitigate cyber-security risk to the enterprise network. Other implementations of this aspect include corresponding systems, apparatus, and computer programs, configured to perform the actions of the methods, encoded on computer storage devices.

These and other implementations can each optionally include one or more of the following features. In some implementations, each rule node is associated with a rule type; and each tactic node is associated with a rule type of the respective at least one rule node that is represented by the tactic node.

In some implementations, converting the analytical attack graph to a tactic graph includes: retrieving, from a database, data that associates tactic nodes with combinations of rule nodes and impact nodes; and replacing combinations of rule nodes and impact nodes of the analytical attack graph with tactic nodes based on the retrieved data.

In some implementations, the analytical attack graph includes one or more fact nodes each representing an input condition.

In some implementations, one or more tactic nodes of the tactic graph each represent at least one fact node in combination with the at least one rule node and the at least one impact node.

In some implementations, generating a process model based on the one or more paths that lead to the particular network impact includes: generating, from the tactic graph, an event log, the event log including a plurality of events, each event being associated with a respective path of the one or more paths of the tactic graph.

In some implementations, each event of the event log is associated with a timestamp indicating a time of the event with respect to a simulated start time of the respective path.

In some implementations, the analytical attack graph data is based on simulated security attacks on the enterprise network.

In some implementations, each rule node is associated with a hardness score representing a difficulty of achieving the network configuration rule by an attacker.

In some implementations, the process model includes one or more network activity nodes, and each network activity node corresponds to one or more tactic nodes of the tactic graph.

In some implementations, the one or more tactic nodes corresponding to a network activity node represent rule nodes of the same rule type.

In some implementations, determining one or more paths of the tactic graph that lead to a particular network impact includes determining the one or more paths using a graph traversal algorithm.

In some implementations, the actions include: comparing network traffic of actual execution of processes within the enterprise network to a set of process models, the set of process models including the process model; and identifying the process as being performed in the enterprise network based on the comparing.

In some implementations, the actions include determining, based on a set of process models, a level of security risk of the enterprise network.

In some implementations, the actions include training a machine-learning (ML) model at least partially based on the process model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
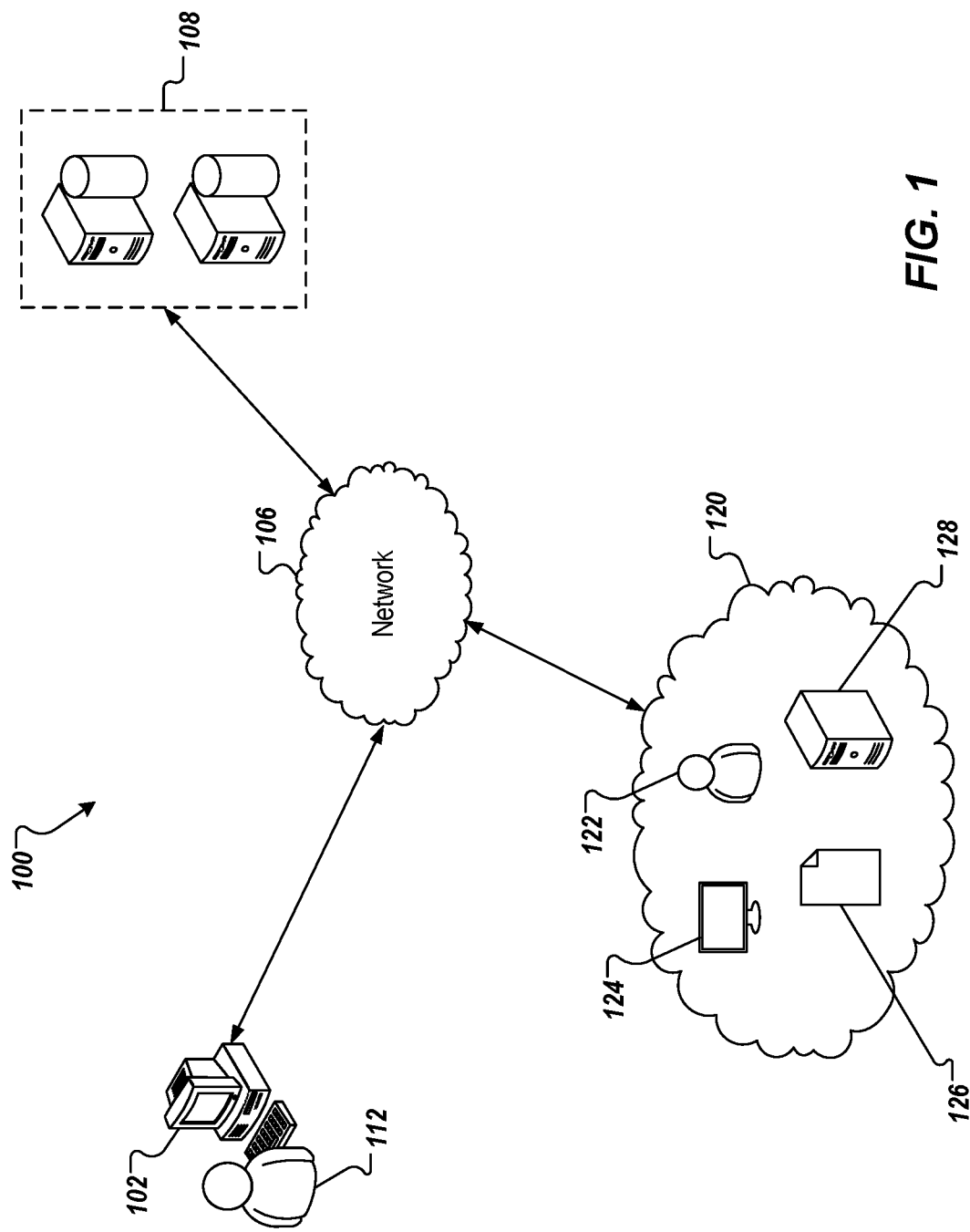
FIG. 1 depicts an example architecture that can be used to execute implementations of the present disclosure.

Implementations of the present disclosure are directed to cyber-attack process discovery in computer networks. More particularly, implementations of the present disclosure are directed to automated cyber-attack process discovery in computer networks by processing analytical attack graphs (AAGs) to provide a cyber-attack process model. In some implementations, actions include receiving analytical attack graph data representative of an analytical attack graph, the analytical attack graph including: one or more rule nodes each representing a network configuration rule; and one or more impact nodes each representing an impact of one or more respective network configuration rules; converting the analytical attack graph to a tactic graph including one or more tactic nodes, each tactic node representing at least one rule node and at least one impact node; determining one or more paths of the tactic graph that lead to a particular network impact; generating a process model based on the one or more paths that lead to the particular network impact, the process model representing network activity for execution of a process that leads to the particular network impact; and executing, within the enterprise network, one or more remedial actions based on the process model to mitigate cyber-security risk to the enterprise network.

To provide context for implementations of the present disclosure, and as introduced above, enterprises execute operations across one or more networks of components, commonly referred to as computer networks. A computer network is made up of multiple interconnected components that communicate with one another to facilitate execution of enterprise operations. Example components can include computers, servers, database systems, and the like. Enterprise operations can include processes that are executed across multiple components within a network.

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

An important aspect in mitigating attacks is an understanding of the relationship between a cyber-attack process and one or more paths within a network that the cyber-attack process occurs over. This can be referred to as cyber-attack process discovery within computer networks. An approach to cyber-attack process discovery within computer networks needs to address multiple technical challenges. Example technical challenges include scalability and technical resources expended for graph processing. For example, AAGs can be provided to represent potential attack paths for a cyber-attack through a computer network. However, the AAGs are relatively large in size, which requires significant bandwidth and processing power for graph-processing of an AAG.

Technical challenges for cyber-attack process discovery can include versatility of the provided graphs. For example, an AAG can represent potential attack paths through a particular computer network. However, the AAG is specific to the particular computer network, and includes configuration items, rules, and facts for the particular computer network. The AAG therefore is generally limited to use in process discovery for the particular network.

Technical challenges for cyber-attack process discovery can also include availability of attack path data. For example, an AAG can be generated using data representing actual attacks that have occurred in computer networks. In some examples, an AAG can be generated using data representing observed attacks that have been performed by a hacker or by programmed bots in computer networks. The AAGs therefore may omit certain activity patterns that correspond to possible attack paths. For example, an attack path that has not yet been performed by a hacker or by an attack bot might not be captured by an AAG. Additionally, generating an AAG based on real-time activity patterns can be time intensive.

Technical challenges for cyber-attack process discovery can also include identifying high priority and low priority attack paths. For example, AAGs can be large in volume and include many attack paths. An AAG might not include information indicating a hardness or difficulty level of each path. Therefore, it can be difficult to prioritize security threats using an AAG.

In view of the above context, implementations of the present disclosure are directed to cyber-attack process discovery in computer networks. More particularly, implementations of the present disclosure are directed to automated cyber-attack process discovery in computer networks by processing AAGs to provide a cyber-attack process model. In general, implementations of the present disclosure address technical challenges, such as those described above, by providing process models that are smaller in size, compared to AAGs. The process models therefore require reduced time, memory, and processing power compared to AAGs.

Implementations of the present disclosure can also address technical challenges, for example, by generating process models based on tactics that can be applied to multiple different computer networks. Therefore, the process models generated according to the present disclosure can have increased versatility and applicability compared to the AAG, as they are not specific to a computer network.

Implementations of the present disclosure can also address technical challenges, for example, by generating process models based on domain knowledge and using inference. An inference engine can consider various configurations, vulnerabilities, privileges, and a set of rules that are inferred to identify possible attack paths. The disclosed processes can include storing information indicating the inferred possible attack paths. The stored information can also include data that associates combinations of rules, impacts, and facts of the attack paths with tactics that can be used to attack the computer network. Therefore, tactics can account for network activity that has not yet been performed by a hacker or an attack bot. As such, the process models generated according to the present disclosure can have increased scope and completeness as compared to the AAGs. The process models can also be generated more quickly, due to not being reliant on real-time monitoring of an attack.

Implementations of the present disclosure can also address technical challenges, for example, by generating process models including attack paths that are encoded with hardness scores. For example, each tactic used to generate the process model can be assigned a hardness score based on the difficulty of the tactic. Therefore, the process models generated according to the present disclosure can have increased contextual information that can be used to prioritize security measures. For example, based on a process model encoded with hardness scores, an analytical service can determine to prioritize implementing security measures an easier attack path over implementing security measures for a more difficult attack path.

To provide further context for implementations of the present disclosure, a computer network is made up of multiple network components, which can be referred to as configuration items (CIs). Example network components can include, without limitation, servers (e.g., web servers, application servers, mail servers, network servers, proxy servers), databases, desktop computers, laptop computers, and the like. Within a computer network, the network components are connected within a network topology. Network components can include information technology (IT) components and operation technology (OT) components. In general, IT components can be described as hardware and/or software for storage, retrieval, transmission, and manipulation of data within a network. In general, OT components can be described as hardware and/or software that detects changes and/or causes changes within a network by the directly monitoring and/or controlling physical devices, processes, and/or events within the network.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provide such services to any number of client devices (e.g., the client device 102 over the network 106). In accordance with implementations of the present disclosure, and as noted above, the server system 108 can host a process discovery platform in accordance with implementations of the present disclosure.

In the example of FIG. 1, an enterprise network 120 is depicted. The enterprise network 120 represents a computer network implemented by an enterprise to perform its operations. That is, one or more processes that support enterprise operations are executed within the enterprise network 120. In some examples, the enterprise network 120 represents on-premise systems (e.g., local and/or distributed), cloud-based systems, and/or combinations thereof. In some examples, the enterprise network 120 includes IT components and OT components. In general, IT components include hardware (e.g., computing devices, servers, computers, mobile devices) and software used to store, retrieve, transmit, and/or manipulate data within the enterprise network 120. In general, OT components include hardware and software used to monitor and detect or cause changes in processes within the enterprise network 120. In some examples, the enterprise network 120 includes multiple assets (e.g., CIs). Example assets include, without limitation, users 122, computing devices 124, electronic documents 126, and servers 128.

In some implementations, the cyber-attack process discovery platform of the present disclosure is hosted within the server system 108. As described in further detail herein, the cyber-attack process discovery platform processes AAGs to provide a cyber-attack process model for each cyber-attack process that can be executed within the enterprise network 120. The cyber-attack process model can be described as a pattern that generically represents execution of a cyber-attack process within the enterprise network 120. In some examples, the cyber-attack process model can be represented in a graph structure. Example graph structures can include, but are not limited to, a petri-net and a causal-net.

In accordance with implementations of the present disclosure, the cyber-attack process models can be stored in a graph database and serve as source to an analytical service. Each cyber-attack process model can represent possible attack path types that exist in the enterprise network 120 in a manner that enables simplified visualization and scalable analytics.

The cyber-attack process model can be a compact model of the cyber-attack process and can enable the analytical service to perform a number of actions. For example, the analytical service can train a machine-learning (ML) model at least partially based on the process model. For example, the analytical service can use the process model train a ML model to recognize network activity that corresponds to potential enterprise network attacks.

The analytical service can use cyber-attack process models to calculate a security risk level for the enterprise network 120. Due to decreased size and processing power requirements, a security risk level of an enterprise network 120 can be determined more quickly, and updated more quickly, using the process models compared to using the AAGs. The calculated security risk level of the enterprise network 120 can be used as a basis for modifying security postures and access requirements of the enterprise network 120.

The analytical service can use cyber-attack process models for predictive monitoring of the enterprise network 120. For example, given that at least a first step of a process model has occurred, the analytical service can identify the step(s) as being part of an attack path of a process model, and can predict the next step to be performed by the attacker. The analytical service can then perform security actions to prevent the attacker from progressing along the attack path.

Figure 2:
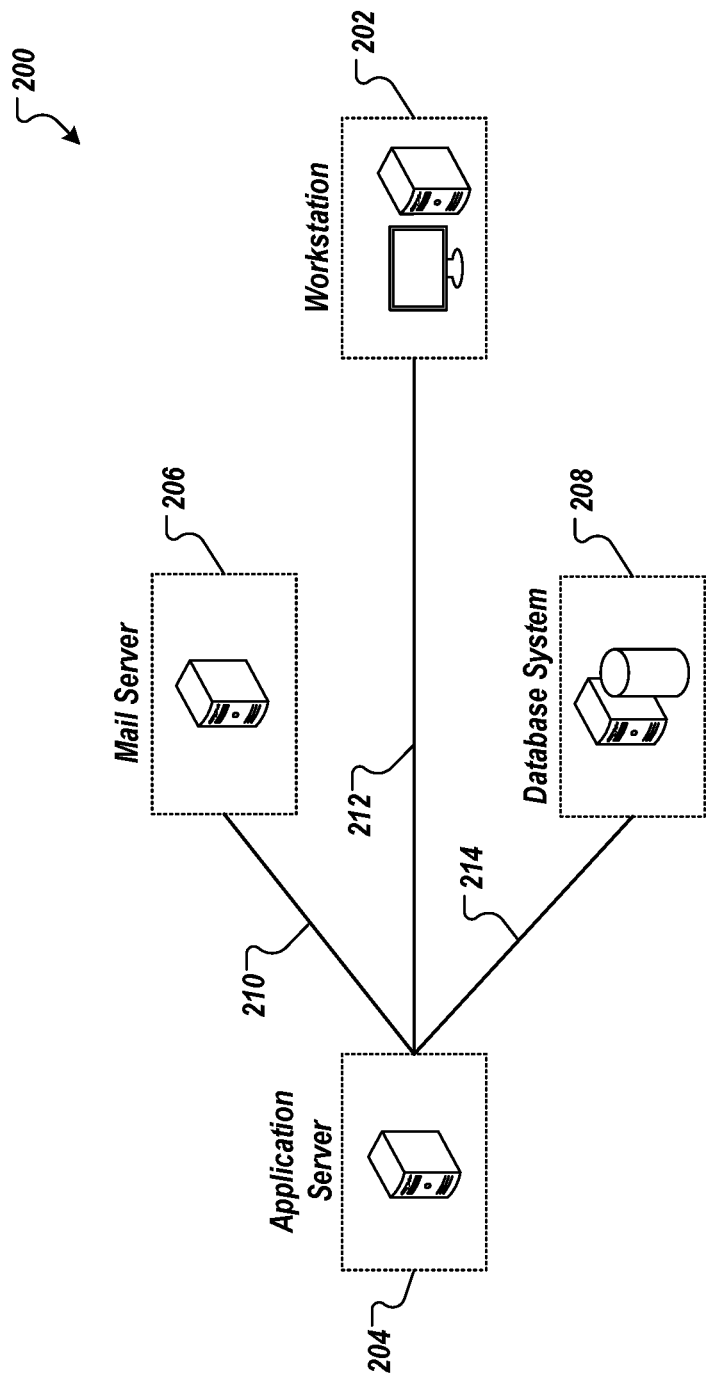
FIG. 2 depicts an example computer network in accordance with implementations of the present disclosure.

FIG. 2 depicts an example portion 200 of a computer network. The example portion 200 graphically represents a network topology of an enterprise network. In some examples, the computer network is graphically represented as nodes 202, 204, 206, 208 and edges 210, 212, 214 between nodes. In some examples, each edge can be associated with a respective session representing communication between nodes. While the example portion 200 of the computer network includes relatively few nodes, it is contemplated that a computer network can include hundreds, or thousands of nodes.

Figure 3:
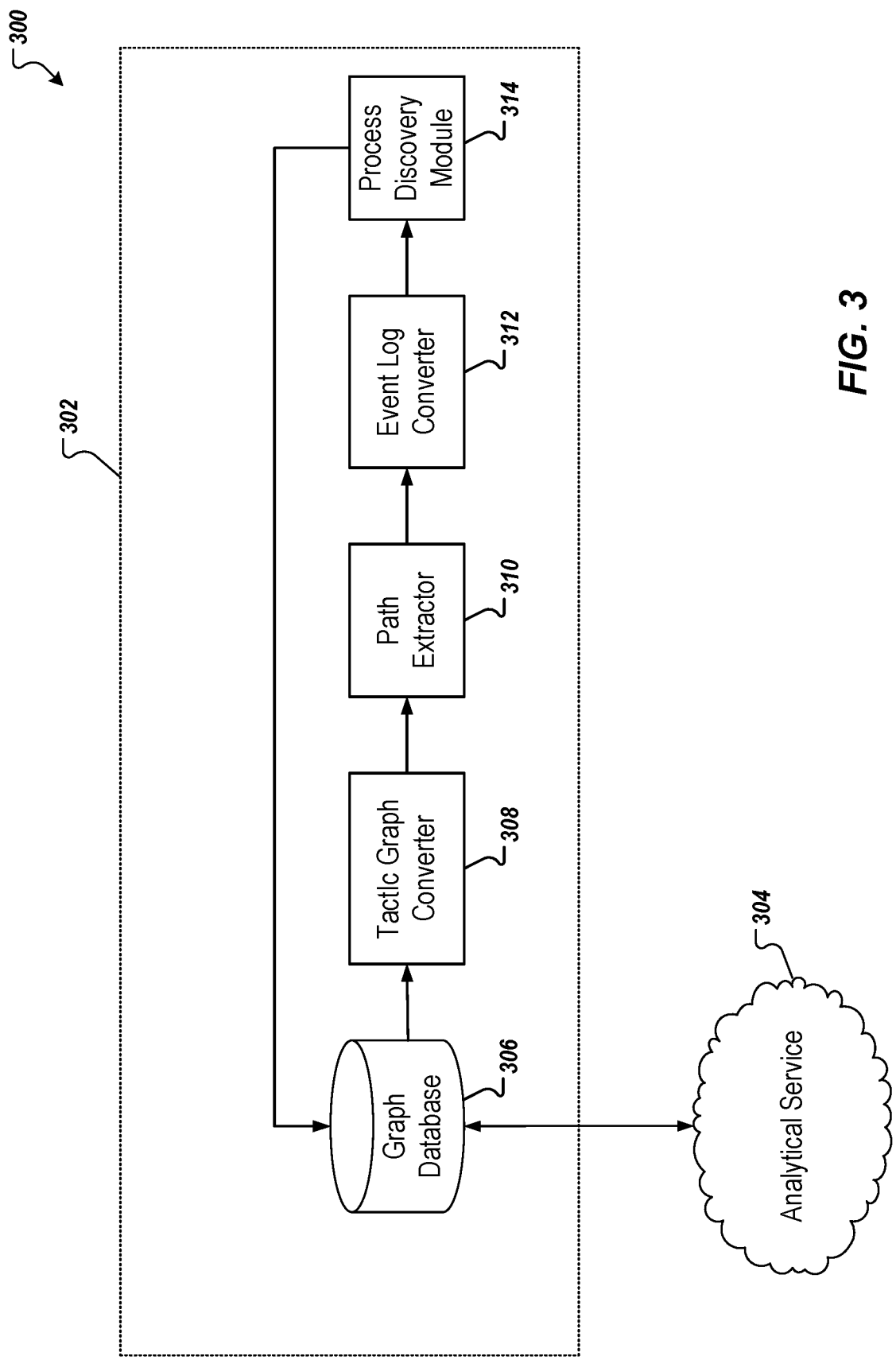
FIG. 3 depicts an example conceptual architecture in accordance with implementations of the present disclosure.
Figure 4:
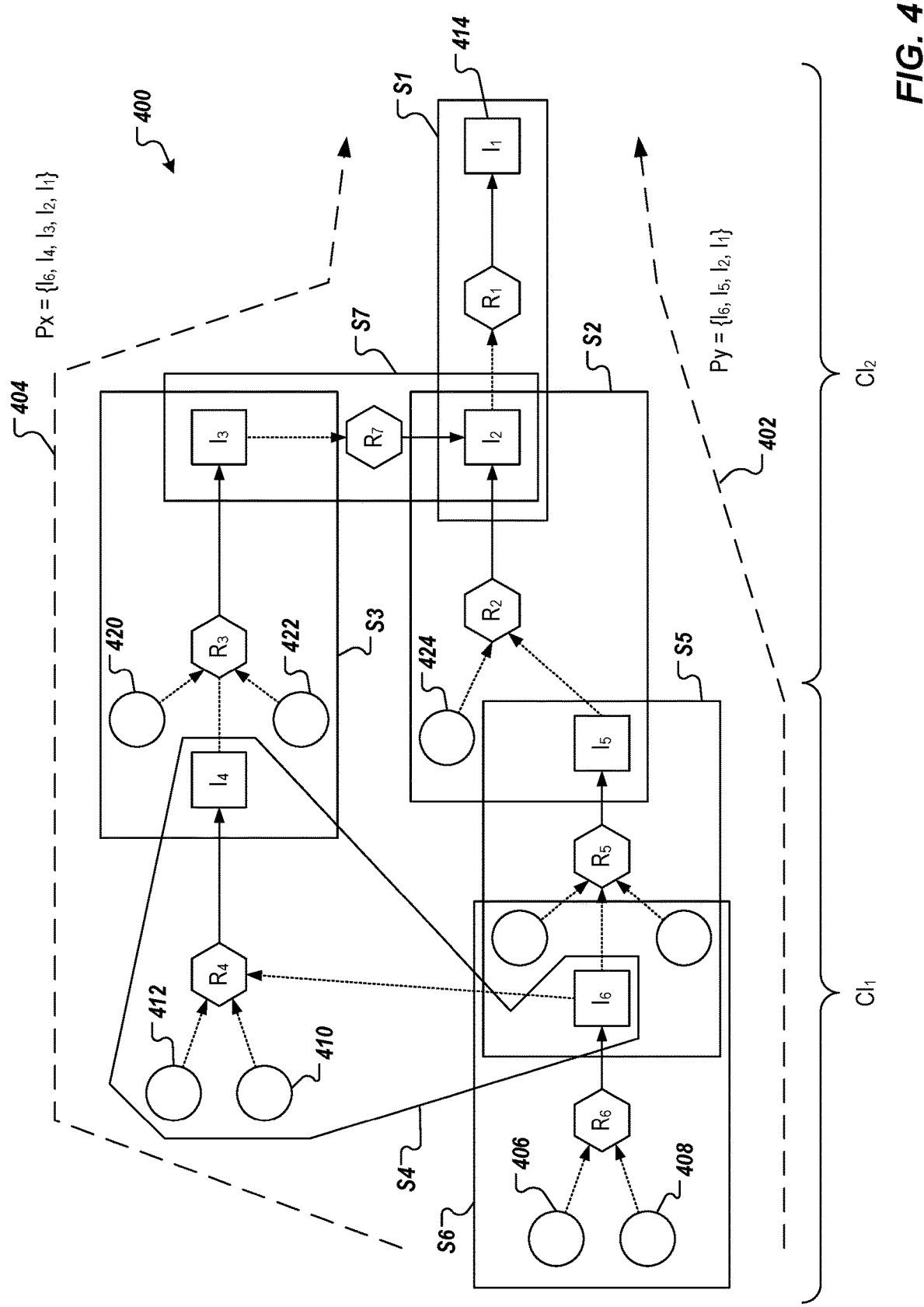
FIG. 4 depicts an example portion of an example analytical attack graph (AAG) including multiple attack paths.
Figure 5:
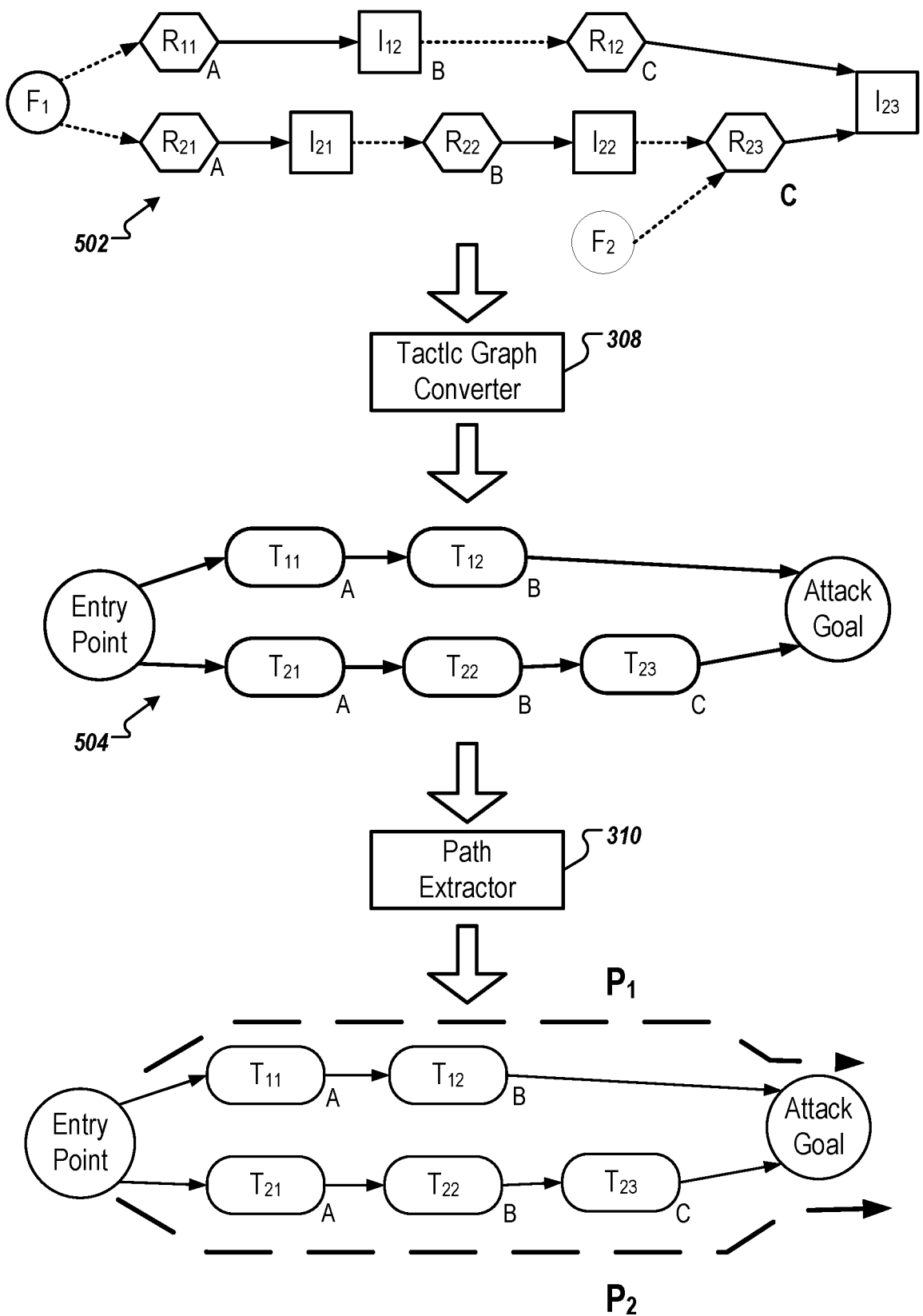
FIG. 5 depicts an example transformation of an example AAG to an example tactic graph and an example extraction of attack paths in accordance with implementations of the present disclosure.
Figure 6:
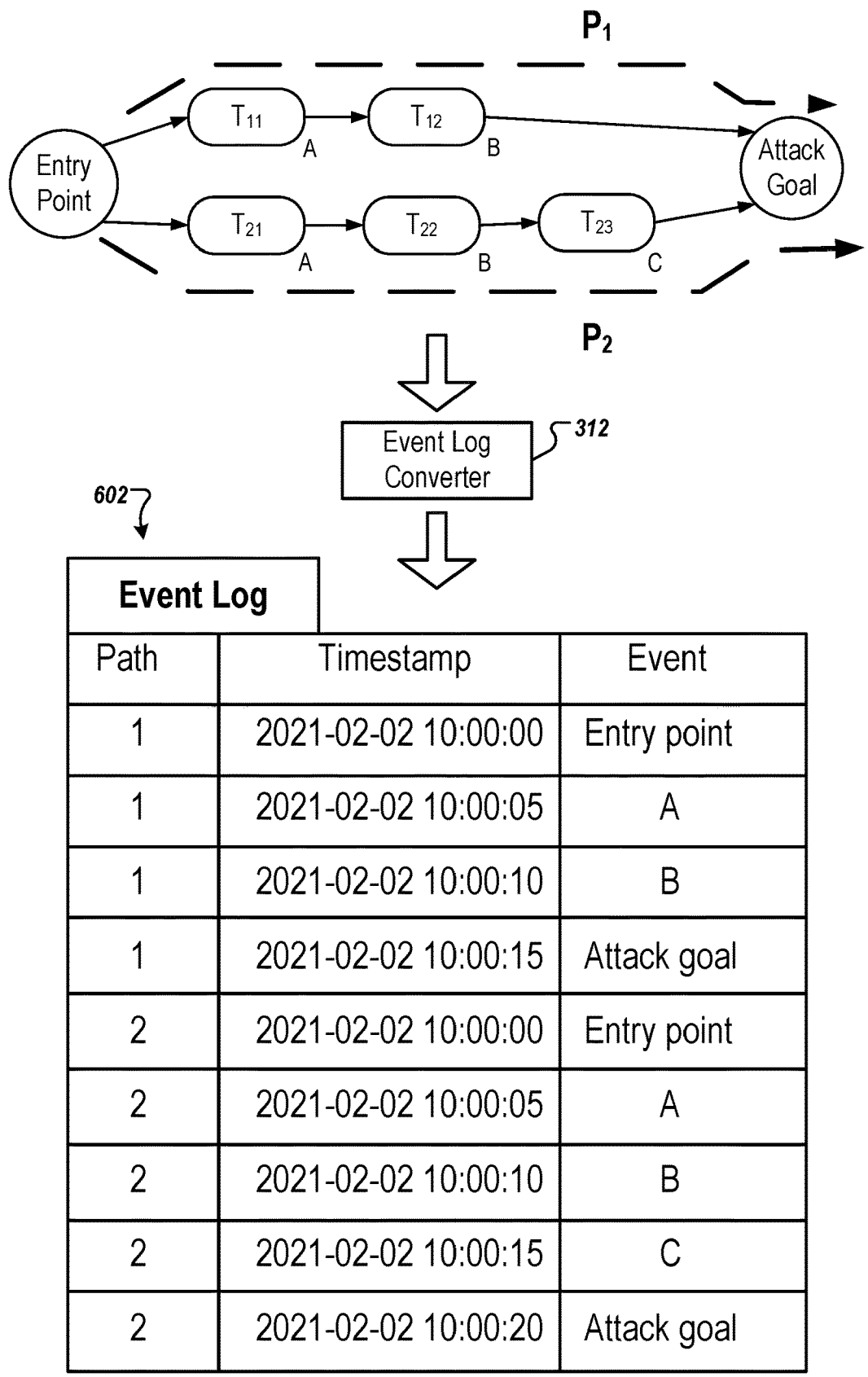
FIG. 6 depicts an example transformation of an example tactic graph to an event log in accordance with implementations of the present disclosure.
Figure 7:
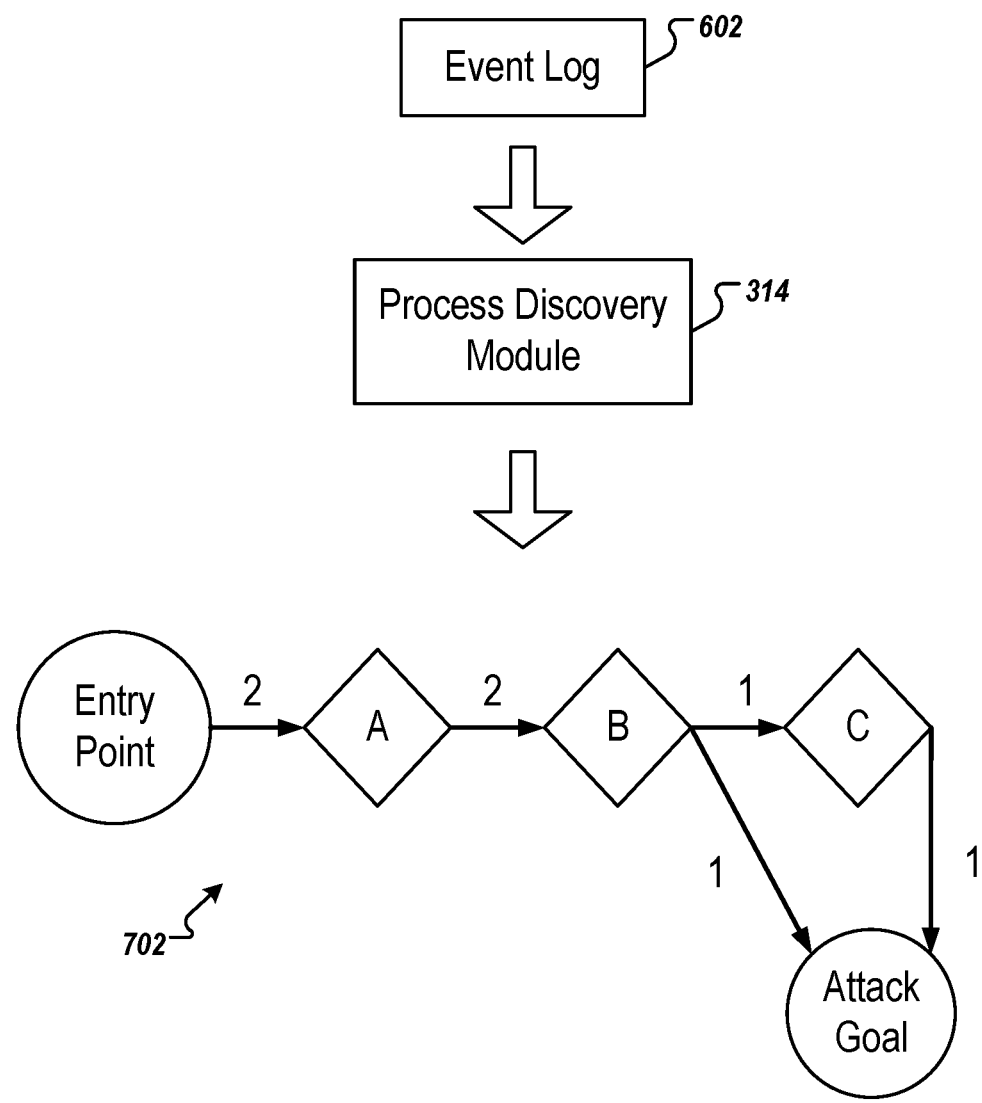
FIG. 7 depicts example process discovery using an example event log.

Implementations of the automated cyber-attack process discovery of the present disclosure are described in further detail herein with reference to FIGS. 3-7. FIG. 3 depicts an example conceptual architecture 300 in accordance with implementations of the present disclosure. FIG. 4 depicts an example portion of an example AAG 400 including multiple attack paths. FIG. 5 depicts an example transformation of an example AAG 502 to an example tactic graph 504 in accordance with implementations of the present disclosure. FIG. 6 depicts an example transformation of the example tactic graph 504 to an event log 602 in accordance with implementations of the present disclosure. FIG. 7 depicts example process discovery using the example event log 602.

With particular reference to FIG. 3, the conceptual architecture 300 includes a process discovery platform 302 and an analytical service 304. As described in further detail herein, the process discovery platform 302 performs automated process discovery to provide a set of process models. Each process model can represent a possible attack process that can be implemented in an enterprise network. In some examples, each process model can be represented in a graph structure. Example graph structures can include, but are not limited to, a dependency flow graph, a petri-net, and a causal-net.

In further detail, and in the example of FIG. 3, the process discovery platform 302 includes a tactic graph converter 308, a path extractor 310, an event log converter 312, and a process discovery module 314. The process discovery platform 302 further includes a graph database 306.

In some examples, the graph database 306 can store AAGs for one or more enterprise networks. The AAGs can be generated, for example, using an inference engine that can consider various configurations, vulnerabilities, privileges, and set of rules that are inferred to identify possible attack paths. The inference engine can generate attack paths for simulated security attacks on the network. The simulated security attacks can simulate sequences of possible actions performed by an attacker. The graph database 306 can store data representing the inferred possible attack paths of the AAGs.

FIG. 4 depicts an example portion 400 of an example AAG to illustrate implementations of the present disclosure. As depicted in the example of FIG. 4, the AAG can include different node types to show how a set of network and system configurations result in unauthorized actions to specific targets. The example portion 400 is depicted in a database structure (e.g., Neo4j graph database structure). Nodes in an AAG are of different types: circular nodes representing system or network configurations that are the conditions (also referred to as facts) that provide possibilities for actions by an attacker; hexagonal nodes representing reasoning rules that represent the attack methodology leveraged by an attacker to achieve a particular goal; and square nodes that represent an impact as a sub-goal for a certain action an attacker could take. The AAG includes two types of edges: configuration-to-rule edges that represent logical AND (i.e., all configuration conditions have to be true to cause the impact); and rule-to-impact edges that represent logical OR (i.e., the impact happens if at least one rule is satisfied).

In general, the AAG is created by taking into account the configurations directed by some rules in order to make some impacts on the target network. In some examples, all configuration nodes, impact nodes, and rule nodes can be provided in sets $N_p$, $N_d$, $N_r$, respectively. Accordingly, $N_p=\{n_{p,j}|n_{p,j} \in V, \forall n_{p,j}$ is a configuration$\}$, $N_d=\{n_{d,j}|n_{d,j} \in V, \forall n_{d,j}$ is an impact$\}$, and $N_r=\{n_{r,j}|n_{r,j} \in V, \forall n_{r,j}$ is a rule$\}$. Consequently, the combination of these sets accounts for all vertices of the graph.

Rule nodes can be associated with a hardness score. The hardness score of a rule can represent a measure of difficulty of achieving the rule by an attacker. The hardness score can be, for example, a score having a value between zero and one. The hardness score can be set as an attribute of an outgoing edge of a rule. Other edges can be assigned a hardness score of zero. In some examples, the hardness score is specified by domain experts. In some examples, the hardness score is embedded within the ontology according to rule type. Rule nodes can also be associated with a rule type. The rule type can be set as a property of each rule.

In some examples, a configuration node is referred to herein as an input fact node indicating facts that are provided as input within a configuration. In some examples, impact nodes are referred to herein as derived fact nodes indicating a derived fact that results from applying one or more input facts and/or one or more derived facts to a rule.

AAGs can be used in cyber-threat analysis to determine attack paths of external attackers into and through a computer network. Use of AAGs in mitigating attacks on computer networks is described in further detail in commonly assigned U.S. application Ser. No. 16/554,846, entitled Generating Attack Graphs in Agile Security Platforms, and filed on Aug. 29, 2019, the disclosure of which is expressly incorporated herein by reference in the entirety for all purposes. Further, generation of AAGs is described in further detail in commonly assigned U.S. application Ser. No. 16/924,483, entitled Resource-efficient Generation of Analytical Attack Graphs, and filed on Jul. 9, 2020, the disclosure of which is expressly incorporated herein by reference in the entirety for all purposes.

With continued reference to FIG. 4, the example portion 400 is spread across a first configuration item ($CI_1$) and a second configuration item ($CI_2$), and each attack path 402, 404, starts from fact nodes (input conditions) 406, 408 to a derived fact node represented as an impact ($I_1$) 414. Each attack path 402, 404 respectively progresses from the fact nodes 406, 408 through derived fact nodes (impacts) based on rules to the impact ($I_1$) 414. However, the attack path 404 is also dependent on fact nodes 410, 412.

In the example of FIG. 4, the attack path 402 (first attack path) is represented as $P_x=\{I_6, I_5, I_2, I_1\}$, and the attack path 404 (second attack path) is represented as $P_y=\{I_6, I_4, I_3I_2, I_1\}$. Progression along the attack paths 402, 404 can be abstracted as progressions between steps (S). In the example of FIG. 4, depicted steps include $S=\{S_1, S_2, S_3, S_4, S_5, S_6, S_7\}$. In some examples, the steps correspond to movement within a physical attach graph (PAG) of the underlying enterprise network.

In the example of FIG. 4, a process risk for a particular process is to be determined, where the second configuration item ($CI_2$) is wholly attributed with execution of the process. That is, the first configuration item ($CI_1$) does not execute any portion of the process, for which a process risk is to be determined. However, the first configuration item ($CI_1$) is along attack paths to the second configuration item ($CI_2$). Consequently, and in this non-limiting example, example CI-1 pairs can be provided as: $CI_2-I_1$, $CI_2-I_2$, and $CI_2-I_3$, each of $I_1$, $I_2$, and $I_3$ being achievable in $CI_2$.

In the example of FIG. 4, a single path is provided to $I_1$, which includes evaluating rule $R_1$ with $I_2$, a single path is provided to $I_3$, which includes evaluating $R_3$ with $I_4$ and other facts represented by fact nodes 420, 422, and multiple paths are provided to $I_2$, which includes evaluating $R_7$ with $I_3$, or evaluating $R_2$ with $I_5$ and another fact represented by a fact node 424.

Referring again to FIG. 3, and in some examples, the tactic graph converter 308 transforms an AAG to a tactic graph. The path extractor 310 can extract attack paths from the tactic graph. FIG. 5 depicts an example transformation of an example AAG 502 to an example tactic graph 504 by the tactic graph converter 308. FIG. 5 also depicts an example extraction of attack paths from the tactic graph 504 by the path extractor 310.

The example AAG 502 includes two attack paths, where an adversary may perform 3 different types of rules (rule type A, rule type B, rule type C) to reach impact 123 of the computer network.

In the AAG 502, each attack path is represented as an AAG subgraph. A first subgraph includes $F_1$, $R_{11}$, $I_{12}$, $R_{12}$, and $I_{23}$. A second subgraph includes $F_1$, $R_{21}$, $I_{21}$, $R_{22}$, $I_{22}$, $F_2$, $R_{23}$, and $I_{23}$. Thus, as shown in AAG 502, rule types A and B are each instantiated twice along, while rule type C is instantiated once.

In some examples, the tactic graph converter 308 can convert the AAG 502 to the tactic graph 504 using a set of conversion rules. In some examples, the conversion rules associate combinations of facts, rules, and impacts with tactics. For example, a conversion rule may specify that a combination of rule $R_{21}$ and impact $I_{21}$ corresponds to tactic $T_{21}$. In some examples, the conversion rules can be pre-programmed based on human input. For example, a user can analyze various rules, facts, and impacts to identify patterns of tactics. As an example, a user can determine that an attacker can use tactic $T_{22}$ to achieve rule $R_{22}$ to reach impact $I_{22}$.

In some examples, tactic nodes of a tactic graph can represent at least one fact node in combination with a rule node, an impact node, or both. For example, a user can determine that given an initial condition specified by fact $F_2$, an attacker can use tactic $T_{23}$ to achieve rule $R_{23}$ to reach impact $I_{23}$.

In some examples, the tactic graph converter 308 can retrieve, from a database, data that associates tactic nodes with combinations of rule nodes, impact nodes, and/or fact nodes. The tactic graph converter 308 can replace combinations of rule nodes, impact nodes, and fact nodes of the analytical attack graph with tactic nodes based on the retrieved data.

In some examples, each tactic can be assigned a rule type. In some examples, each tactic node is associated with the rule type of the respective rule node or nodes that are represented by the tactic node. For example, tactic node $T_{21}$ can be associated with rule type A as a result of rule node $R_{21}$ being associated with rule type A, and rule node $R_{21}$ being represented by tactic node $T_{21}$ in the tactic graph.

Facts, rules, and impacts of each tactic are represented in the tactic graph within a tactic node, rather than as separated nodes. Each node of the tactic graph 504 represents a tactic that can be performed in a computer network. The tactic graph 504 reflects the sequential order of the attack path. For example, $T_{11}$ represents an attack tactic that enables an adversary to perform the next attack tactic of $T_{12}$.

In the tactic graph 504, each attack path is represented as a tactic graph subgraph. A first subgraph includes $T_{11}$ and $T_{12}$. A second subgraph includes $T_{21}$, $T_{22}$, and $T_{23}$. Thus, as shown in tactic graph 504, and consistent with AAG 502, tactics of rule types A and B are each instantiated twice along, while rule type C is instantiated once. For example, $T_{11}$ and $T_{21}$ have the same rule type of rule type A. This indicates that the same type of tactic can be executed on two different hosts in a simulated attack pattern.

Representation of attack paths in a tactic graph can enable retrieval of attack paths using graph traversal algorithms. For example, the path extractor 310 can use graph traversal algorithms to determine one or more paths of the tactic graph 504 that lead to a particular network impact (e.g., an attack goal represented by $I_{23}$).

In some examples, the path extractor 310 can extract paths from the tactic graph 504 using a breadth-first search (BFS) algorithm. In some examples, the path extractor 310 can extract paths from the tactic graph 504 using a depth-first search (DFS) algorithm.

In some examples, the path extractor 310 can extract paths from the tactic graph 504 using a k shortest path algorithm. When using a k shortest path algorithm, the path extractor 310 can use hardness scores as relationship weights. In some examples, the path extractor 310 can extract paths from the tactic graph 504 using a random walk algorithm.

The path extractor 310 extracts two attack paths from the tactic graph 504. A first path $P_1$ includes $T_{11}$ and $T_{12}$. A second path $P_2$ includes $T_{21}$, $T_{22}$, and $T_{23}$.

In some examples, the event log converter 312 can convert the paths to an event log. FIG. 6 depicts an example transformation of an example tactic graph to an event log in accordance with implementations of the present disclosure. For example, the event log converter 312 can generate, from the paths $P_1$ and $P_2$, an event log 602. The event log 602 includes a series of events. Each event of the event log 602 is associated with a path extracted from the tactic graph 504.

The event log 602 can be a log of simulated events according to the extensible event stream (XES) format. Each event of the event log 602 refers to a case, an activity, and a point in time. In the example of FIG. 6, each event of the event log includes refers to a case that corresponds to a path, an activity that corresponds to a rule type, and a point in time that corresponds to a timestamp with reference to a simulated start time of the respective attack path.

FIG. 7 depicts example process discovery using an example event log. For example, the process discovery module 314 can perform process discovery using the event log 602. In some examples, the process discovery module 314 can perform process discovery using a direct flows graph. In some examples, the process discovery module 314 can perform process discovery using an inductive miner algorithm. In some examples, the process discovery module 314 can perform process discovery using a heuristic miner algorithm.

The process discovery module 314 generates a process model 702 including multiple network activity nodes. Each network activity node in the process model 702 represents one or more tactics associated with a particular rule type. For example, network activity node A of the process model 702 represents tactic $T_{11}$ and tactic $T_{21}$. Both tactic $T_{11}$ and tactic $T_{21}$ represent rules of rule type A. Thus, tactic $T_{11}$ and tactic $T_{21}$ are included in different paths of the tactic graph 504, yet are combined into a same network activity node A of the process model 702.

Each edge in the process model 702 can represent a possible transition between two network activity nodes. For example, each edge can represent a possible usage of two or more tactics of an attack path. Each edge can have multiple properties. For example, each edge can have a property of transition frequency, probability, and hardness score.

In the examples illustrated in FIGS. 5 to 7, the number of graph nodes is reduced from eleven to five, while preserving key features of calculating analytics according to the described usages. Process model 702 can be considered a compact representation of an AAG, encoded with frequencies and probabilities of various attack paths.

The process model 702 can be stored in the graph database 306. Process models of the graph database can be provided to an analytical service 304. The analytical service 304 can compare network activity to process models of the graph database 305 to perform network security functions. For example, the analytical service 304 can use the process models to determine a security risk level of the network, to identify and predict network attacks, to prevent network attacks, etc.

For example, the analytical service 304 can monitor and track network activity within an enterprise network. The analytical service 304 can compare the network activity to process models of the graph database 305. Based on the comparison, the analytical service 304 may determine that the process defined by a process model (e.g., the process model 702) is being performed in the enterprise network or has been performed in the enterprise network.

For example, the analytical service 304 may determine that a tactic of rule type A has been performed in the enterprise network. Therefore, the analytical service 304 can determine that the process represented by the process model 702 is likely in progress, and that the attacker is likely going to perform a tactic of rule type B. In response to determining that an attack is in progress, the analytical service 304 can perform action such as increasing an assigned security risk level of the computer network, restricting access to certain network components, generating an alert, etc.

With regard to detecting cyber-attacks on a live computer network, network traffic patterns can be collected during enterprise operations. One or more network traffic patterns can be compared to process models within a set of process models, each process model in the set of process models being generated by the process discovery platform of the present disclosure, as described herein. In some examples, if a network traffic pattern is determined to sufficiently match a process model, the network traffic pattern can be determined to correspond to the process associated with the process model.

To detect cyber-attacks on a live computer network, the analytical service 304 can compare observed behavior of the network to the generated process models. The observed behavior of the network can include network traffic events or any other events captured by data collection platforms, e.g., as represented by cases of an event log.

Comparing the observed behavior to the process models can include performing a conformance check that measures one or more conformance statistics. Results of the conformance check can indicate whether the observed behavior matches the process model, identify where deviations occur, and indicate how severely the observed behavior does not comply the process model.

Conformance statistics can include, for example, a log-model fitness and a precision of the observed behavior according to the process model. A process model with good fitness allows for most or all of the behavior of the event log. A process model with good precision does not allow for much more behavior than what is included in the event log.

Fitness of the observed behavior can be calculated, for example, by constructing alignments among each case observed in an event log of observed behavior to a process model's petri net. Fitness between the event log and the process model can then be determined as an average of cases fitness across all event log cases. Another approach to calculating fitness uses token-based replay to calculate fitness. The token-based replay approach matches an event log case to a petri net process model to discover which transitions are executed and in which places there are remaining or missing tokens for the given case.

Precision of the observed behavior can be calculated, for example, by transforming a process model's petri net to a transition system. For each event, an amount of observed behavior in the event log and its allowed behavior according to a transition system can be determined. Precision can be calculated as a ratio between a summarization of observed behaviors across all events of the event log and a summarization of allowed behaviors across all events according to the transition system.

If the conformance statistics, e.g., fitness and precision, are above a threshold fitness and precision, the analytical service 304 can determine that the observed behavior satisfies criteria for matching the process model. Based on determining that the observed behavior satisfies criteria for matching the process model, the analytical service 304 can determine that the observed behavior corresponds to potential attacker behavior as defined in the process model.

With regard to supporting ML approaches, the process models generated in accordance with implementations of the present disclosure can be used as training data to train one or more ML models. For example, one or more ML models can be used to monitor network traffic and perform certain functionality (e.g., alert to anomalous activity, identify instances of processes being executed within a network). That is, for example, an ML model can receive network traffic as input, process the network traffic, and provide output (e.g., an alert indicating anomalous activity and/or an instance of process execution). To enable this, the ML model is trained using training data. In this case, the training data can include processes and respective process models. For example, each process model is labeled with a respective process that it represents to provide labeled training data for supervised learning of the ML model.

In general, a ML model is iteratively trained, where, during an iteration, one or more parameters of the ML model are adjusted, and an output is generated based on the training data. For each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration of training. In some instances, this process is repeated until the loss value meets the expected value.

In some examples, in response to determining that the process (i.e., an attack) is being performed in the enterprise network or has been performed in the enterprise network, one or more remedial actions can be taken based on the process model to mitigate cyber-security risk to the enterprise network. Example remedial actions can include, without limitation, a remedial action that increases the difficulty (hardness) in achieving an impact, and a remedial action that entirely removes an impact from being achieved. For example, software can be updated (e.g., patched) to obviate a security loophole in a previous version of the software. As another example, access to a configuration item can be (temporarily) blocked to inhibit completion of the process (e.g., a configuration item that is along the process represented in the process model).

Figure 8:
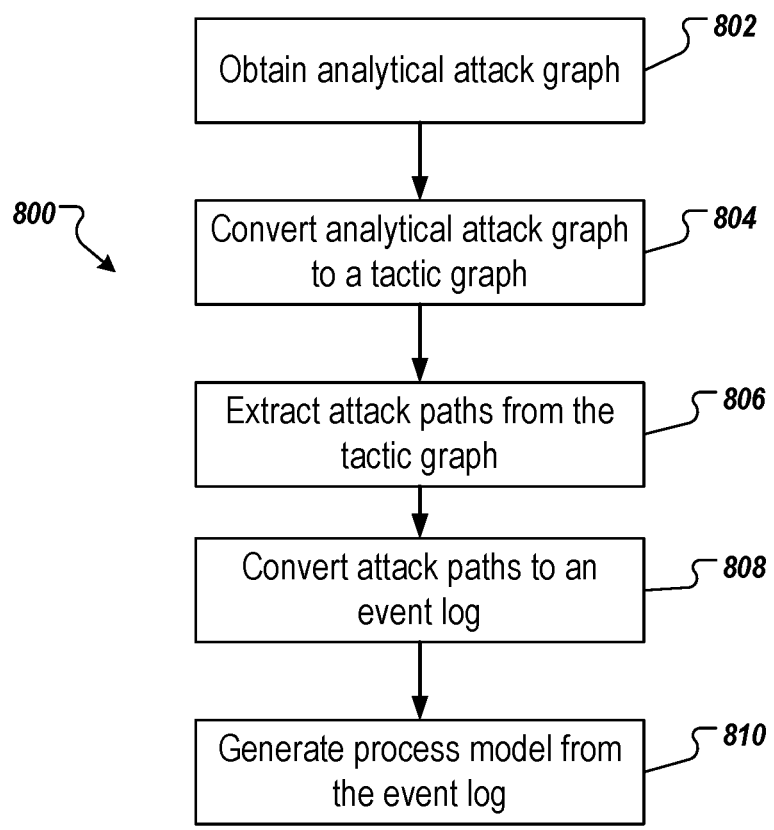
FIG. 8 depicts an example process that can be executed in accordance with implementations of the present disclosure.

FIG. 8 depicts an example process 800 that can be executed in accordance with implementations of the present disclosure. In some implementations, the example process 800 may be performed using one or more computer-executable programs executed using one or more computing devices. In some examples, the example process 800 can be executed for each of one or more processes executed during enterprise operations to provide an attack process model for each attack.

The process 800 includes obtaining an AAG (802). For example, and as described herein, the tactic graph converter 308 can obtain the AAG 502 from the graph database 306. The process 800 includes converting the AAG to a tactic graph (804). For example, and as described herein, the tactic graph converter 308 can transform the AAG 502 to the tactic graph 504. Each tactic of the tactic graph 504 can represent a combination of rules, impacts, facts, or any of these.

The process 800 includes extracting attack paths from the tactic graph (806). For example, and as described herein, the path extractor 310 can extract paths P1 and P2 from the tactic graph 504. The process 800 includes converting attack paths to an event log (808). For example, and as described herein, the event log converter 312 can convert the paths P1 and P2 to the event log 602.

The process 800 includes generating a process model from the event log (810). For example, and as described herein, the process discovery module 314 can generate a process model 702 from the event log 602. The process model 702 can be provided to an analytical service 304 for use in analyzing a security posture of an enterprise network and guarding against cyber-attacks on the enterprise network.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for security of an enterprise network, comprising:
   receiving, by one or more processors, analytical attack graph data representative of an analytical attack graph, the analytical attack graph including:
      one or more rule nodes each representing a network configuration rule; and
      one or more impact nodes each representing an impact of one or more respective network configuration rules;
   converting, by the one or more processors, the analytical attack graph to a tactic graph including one or more tactic nodes, each tactic node representing at least one rule node and at least one impact node, the converting comprising:
      retrieving, from a database, data that associates tactic nodes with combinations of rule nodes and impact nodes; and
      replacing combinations of rule nodes and impact nodes of the analytical attack graph with tactic nodes based on the retrieved data;
   determining, by the one or more processors, one or more paths of the tactic graph that lead to a particular network impact;
   generating, by the one or more processors, a process model that is different from the tactic graph, based on the determined one or more paths that lead to the particular network impact, the process model representing network activity for execution of a process that leads to the particular network impact; and
   executing, by the one or more processors and within the enterprise network, one or more remedial actions based on the process model to mitigate cyber-security risk to the enterprise network.

2. The method of claim 1, wherein:
each rule node is associated with a rule type; and
each tactic node is associated with a rule type of the respective at least one rule node that is represented by the tactic node.

3. The method of claim 1, wherein the analytical attack graph includes one or more fact nodes each representing an input condition.

4. The method of claim 3, wherein one or more tactic nodes of the tactic graph each represent at least one fact node in combination with the at least one rule node and the at least one impact node.

5. The method of claim 1, wherein generating a process model based on the one or more paths that lead to the particular network impact comprises:
generating, from the tactic graph, an event log, the event log including a plurality of events, each event being associated with a respective path of the one or more paths of the tactic graph.

6. The method of claim 5, wherein each event of the event log is associated with a timestamp indicating a time of the event with respect to a simulated start time of the respective path.

7. The method of claim 1, wherein the analytical attack graph data is based on simulated security attacks on the enterprise network.

8. The method of claim 1, wherein each rule node is associated with a hardness score representing a difficulty of achieving the network configuration rule by an attacker.

9. The method of claim 1, wherein:
the process model includes one or more network activity nodes, and
each network activity node corresponds to one or more tactic nodes of the tactic graph.

10. The method of claim 9, wherein the one or more tactic nodes corresponding to a network activity node represent rule nodes of the same rule type.

11. The method of claim 1, wherein determining one or more paths of the tactic graph that lead to a particular network impact includes determining the one or more paths using a graph traversal algorithm.

12. The method of claim 1, further comprising:
comparing network traffic of actual execution of processes within the enterprise network to a set of process models, the set of process models comprising the process model; and
identifying the process as being performed in the enterprise network based on the comparing.

13. The method of claim 1, further comprising determining, based on a set of process models, a level of security risk of the enterprise network.

14. The method of claim 1, further comprising training a machine-learning (ML) model at least partially based on the process model.

15. A non-transitory computer-readable storage medium coupled to one or more processors and having instructions stored thereon which, when executed by the one or more processors, cause the one or more processors to perform operations for process discovery in an enterprise network, the operations comprising:
receiving, by the one or more processors, analytical attack graph data representative of an analytical attack graph, the analytical attack graph including:
one or more rule nodes each representing a network configuration rule; and
one or more impact nodes each representing an impact of one or more respective network configuration rules;
converting, by the one or more processors, the analytical attack graph to a tactic graph including one or more tactic nodes, each tactic node representing at least one rule node and at least one impact node, the converting comprising:
retrieving, from a data base, data that associates tactic nodes with combinations of rule nodes and impact nodes; and
replacing combinations of rule nodes and impact nodes of the analytical attack graph with tactic nodes based on the retrieved data;
determining, by the one or more processors, one or more paths of the tactic graph that lead to a particular network impact;
generating, by the one or more processors, a process model that is different from the tactic graph based on the determined one or more paths that lead to the particular network impact, the process model representing network activity for execution of a process that leads to the particular network impact; and
executing, by the one or more processors and within the enterprise network, one or more remedial actions based on the process model to mitigate cyber-security risk to the enterprise network.

16. The non-transitory computer-readable storage medium of claim 15, wherein:
each rule node is associated with a rule type; and
each tactic node is associated with a rule type of the respective at least one rule node that is represented by the tactic node.

17. The non-transitory computer-readable storage medium of claim 15, wherein the analytical attack graph includes one or more fact nodes each representing an input condition.

18. A system, comprising:
one or more computers; and
a computer-readable storage device coupled to the one or more computers and having instructions stored thereon which, when executed by the one or more computers, cause the one or more computers to perform operations for process discovery in an enterprise network, the operations comprising:
receiving, by one or more computers, analytical attack graph data representative of an analytical attack graph, the analytical attack graph including:
one or more rule nodes each representing a network configuration rule; and
one or more impact nodes each representing an impact of one or more respective network configuration rules;
converting, by the one or more computers, the analytical attack graph to a tactic graph including one or more tactic nodes, each tactic node representing at least one rule node and at least one impact node, the converting comprising:
retrieving, from a data base, data that associates tactic nodes with combinations of rule nodes and impact nodes; and
replacing combinations of rule nodes and impact nodes of the analytical attack graph with tactic nodes based on the retrieved data;
determining, by the one or more computers, one or more paths of the tactic graph that lead to a particular network impact;

generating, by the one or more computers, a process model that is different from the tactic graph based on the determined one or more paths that lead to the particular network impact, the process model representing network activity for execution of a process that leads to the particular network impact; and executing, by the one or more computers and within the enterprise network, one or more remedial actions based on the process model to mitigate cyber-security risk to the enterprise network.

\* \* \* \* \*

UNITED STATES PATENT AND TRADEMARK OFFICE
CERTIFICATE OF CORRECTION

PATENT NO. : 11,895,150 B2
APPLICATION NO. : 17/387603
DATED : February 6, 2024
INVENTOR(S) : Gal Engelberg, Moshe Hadad and Alexander Basovskiy It is certified that error appears in the above-identified patent and that said Letters Patent is hereby corrected as shown below:

In the Claims

In Claim 15, Column 18, Line 9, delete "data base," and insert -- database, --.

In Claim 18, Column 18, Line 59, delete "data base," and insert -- database, --.

Signed and Sealed this
Twenty-sixth Day of March, 2024

Katherine Kelly Vidal
*Director of the United States Patent and Trademark Office*